United States Patent [19]

Kaczur

[11] Patent Number: 4,606,843

[45] Date of Patent: Aug. 19, 1986

[54] PROCESS FOR PRODUCING A DRIED, STABLE MIXTURE OF ALKALI METAL OR ALKALINE EARTH METAL FERRATE (VI) COMPOUNDS WITH HYDROXIDES AND CARBONATES

[75] Inventor: Jerry J. Kaczur, Cleveland, Tenn.

[73] Assignee: Olin Corporation, Cheshire, Conn.

[21] Appl. No.: 694,580

[22] Filed: Jan. 24, 1985

[51] Int. Cl.$^4$ .......................... C01B 13/36; F26B 5/04
[52] U.S. Cl. ................................ 252/186.33; 34/15; 423/594
[58] Field of Search ............... 252/315.01, 62.6, 62.63, 252/186.33; 423/594; 34/15, 26

[56] References Cited

U.S. PATENT DOCUMENTS

| | | | |
|---|---|---|---|
| 1,540,445 | 6/1925 | Wilson | 252/315.01 X |
| 1,799,248 | 4/1931 | Reinhardt | 34/15 |
| 2,835,553 | 5/1958 | Harrison et al. | 423/594 |
| 3,049,404 | 8/1962 | Wade, Jr. | 423/594 X |
| 4,304,760 | 12/1981 | Mein et al. | 423/150 |
| 4,500,499 | 2/1985 | Kaczur et al. | 423/594 X |

OTHER PUBLICATIONS

J. R. Gump: "The Preparation and Properties of Metal Ferrates (VI)", Dissertation Abst., vol. 20, 1960, pp. 3502–3503.

*Primary Examiner*—Richard D. Lovering
*Attorney, Agent, or Firm*—William A. Simons; Thomas P. O'Day

[57] ABSTRACT

Disclosed is a process for preparing a dried, stable mixture of at least one alkali metal or alkali earth metal ferrate (VI) compound with alkali metal or alkaline earth metal hydroxide and carbonate compounds comprising:

(a) vacuum drying a crude ferrate cake which comprises at least one solid alkali metal or alkaline earth metal ferrate (VI) in admixture with a liquid mother liquor comprising of at least one alkali metal or alkaline earth metal hydroxide and water wherein the amount of said hydroxide is from about 20% to about 50% by weight of the mother liquor; said vacuum drying being carried out at a temperature from about 60° C. to about 90° C. for a sufficient amount of time to remove a portion of said water from said mother liquor and thereby increase the hydroxide concentration in the mother liquor to a range from about 55% to about 70% by weight; and (b) further drying said reduced water-content crude ferrate cake at a temperature from about 110° C. to about 160° C. with a heated gas stream for a sufficient amount of time to form a substantially water-free dried ferrate cake; said gas stream containing a sufficient amount of $CO_2$ to react with a portion of said hydroxide present in said mother liquor and thereby forming a dried, stable mixture of at least one alkali metal or alkaline earth metal ferrate (VI) compound with alkali metal or alkaline earth metal hydroxide and carbonate compounds.

5 Claims, No Drawings

PROCESS FOR PRODUCING A DRIED, STABLE MIXTURE OF ALKALI METAL OR ALKALINE EARTH METAL FERRATE (VI) COMPOUNDS WITH HYDROXIDES AND CARBONATES

BACKGROUND OF THE INVENTION

1. Field of the Invention

The present invention relates to a process for producing a dried, stable mixture of at least one alkali metal or alkaline earth metal ferrate [(VI) or $(FeO_4^{-2})$] compound with alkali metal or alkaline earth metal hydroxide and carbonate compounds.

2. Background of the Invention

U.S. Pat. No. 4,307,760, which issued to Mein et al on Dec. 8, 1981, disclosed a process for recovering crystals of potassium ferrate (VI), $K_2FeO_4$, from a residual potassium hydroxide solution by washing the crystals with a concentrated (i.e. over 30% by weight) aqueous solution of a potassium salt of an inorganic acid (e.g. $K_3PO_4$, $K_2CO_3$, KF, $K_4P_2O_7$ and $K_2HPO_4$) and at a pH greater than 9.0 to remove the residual KOH solution. After the removal of the KOH by this washing step, the ferrate product was dried in a moving air stream at 20° C. to 100° C. to remove the residual water. The patent states that drying converts any further residual KOH to $K_2CO_3$, but also does not explain how this is accomplished. This patent is incorporated herein by reference in its entirety. As indicated in said Mein et al. patent, alkali metal ferrates, such as pottassium ferrate (VI), are known oxidizing agents.

This Mein et al patent urges that its recovery process is a significant improvement over the earlier recovery methods which incorporated a succession of different organic solvents such as methanol, ethanol, ethers and the like because those organic solvents may present fire, explosive and toxicity hazards as well as may react with the ferrate compounds. However, it should be noted that this process disclosed in the Mein et al patent also has problems associated with it which may hinder its commercial applicability. For instance, the use of aqueous potassium salt wash solutions increase the raw material costs for the ferrate product and present handling and recycle problems. Also, the dried product of this process may not be that stable due to the presence of water hydrates of the carbonate compounds (e.g. $K_2CO_3 \cdot 1\frac{1}{2}H_2O$, $K_2CO_3 \cdot 2H_2O$) which are not readily removed with drying temperatures under 100° C. Accordingly, there is a need in the art for an improved process which removes a portion of the residual hydroxide (e.g. KOH, NaOH) from the ferrate material to form a dried, stable ferrate-containing product.

BRIEF SUMMARY OF THE INVENTION

The present invention, therefore, is directed to a process for preparing a dried, stable mixture of at least one alkali metal or alkaline earth metal ferrate (VI) compound with alkali metal or alkaline earth metal hydroxide and carbonate compounds comprising:

(a) vacuum drying a crude ferrate cake which comprises at least one solid alkali metal or alkaline earth metal ferrate (VI) in admixture with a liquid mother liquor comprising at least one alkali metal or alkaline earth metal hydroxide and water, wherein the amount of said hydroxide is from about 20% to about 50% by weight of the mother liquor; said vacuum drying being carried out at a temperature from about 60° C. to about 90° C. for a sufficient amount of time to remove a portion of said water from said mother liquor and thereby increase the hydroxide concentration in the mother liquor to a range from about 55% to about 70% by weight; and (b) further drying said reduced-water content crude ferrate cake at a temperature from about 110° C. to about 160° C. with a heated as stream for a sufficient amount of time to form substantially water-free dried ferrate cake; said gas stream containing a sufficient amount of $CO_2$ to react with at least a portion of the alkali metal or alkaline earth metal hydroxide present in said crude cake, thereby forming a dried, stable mixture of at least one alkali metal or alkaline earth metal ferrate (VI) compound with alkali metal or alkaline earth metal hydroxide and carbonate compounds.

DETAILED DESCRIPTION

The crude ferrate cake which is used in the above-noted two-stage drying/carbonation process of this invention may be made by either electrolytic-type or hypochlorite-type or other methods known for making ferrate (VI) salts. After their production, the ferrate salts are removed from the reaction mixture through their precipitation in an alkali metal or alkaline earth metal hydroxide solution. The separation of the solid ferrate salts from the hydroxide solution creates a hydroxide-containing mother liquor and a crude ferrate cake containing some retained mother liquor. Generally, the mother liquor for such processes contain from about 20% to about 50% by weight alkali metal hydroxides with the balance mostly water.

It is desirable to remove as much mother liquor as possible from the crude cake before the process of the present invention. Generally, it is preferred to have a retained mother liquor in an amount from about 1% to about 20% by weight of the total resulting crude ferrate cake. More preferable, it is desired that this amount be from about 1% to about 10% by weight of the cake. The preferred method of separating the major portion of the mother liquor from the crude cake is by centrifugation.

The crude ferrate cake employed in the present invention contains, besides at least one alkali metal or alkaline earth metal ferrate (VI) salt, water, alkali metal hydroxides and alkaline earth metal hydroxides. These important constituents are preferably present in the total crude ferrate cake (i.e. solid cake and liquid mother liquor combined) in the following percentages:

(a) from about 45% to about 97% by weight of at least one alkali metal (e.g. Na, K) or alkaline earth metal (e.g. Ba, Sr) ferrate; (b) from about 0.2% to about 10% of at least one alkali metal or alkaline earth metal hydroxide; and (c) from about 0.5% to about 16% by weight water. Other impurities which may or may not be present include alkali metal and alkaline earth metal carbonates, chlorides, and chlorates and iron-containing compounds such as $Fe_2O_3$ or $Fe(OH)_3$. These other constituents which are not critical to the present invention are preferably present in the crude ferrate cake in the following percentages:

(d) 0% to about 10% alkali metal and alkaline metal chlorides $(Cl^-)$; (e) 0% to about 5% chlorates $(ClO_3^-)$; (f) 0% to about 10% alkali metal and alkaline earth metal carbonates, as well as (g) 0% to about 5% of iron impurities such as $Fe_2O_3$ or $Fe(OH)_3$. The amounts of each impurity will depend upon the process used in producing the crude ferrate cake and the amount of mother liquor remaining in the crude ferrate cake.

The preferred ferrate salts are alkali metal ferrates. Sodium and potassium ferrates are most preferred. The term "at least one" ferrate is employed to encompass both single ferrate salts such as $Na_2FeO_4$ or $K_2FeO_4$ or mixtures of mixed crystalline salts thereof such as $3K_2FeO_4 \cdot NaFeO_4$. This latter mixture of ferrate salts is produced by addition of KOH to a solution of $Na_2FeO_4$ in a sodium hydroxide solution.

Large ferrate particle sizes are preferred since the larger the particle, the less mother liquor that may be retained on the surface of the crude cake. Also, the larger particles mean that less surface area is exposed to the carbonating process. Preferred particle sizes are at least about 50 microns, more preferably at least about 1000 microns.

The first step of the process of the present invention is a vacuum drying step to remove at least a portion of the water present in the retained mother liquor of the crude ferrate cake and thereby increase the hydroxide concentration in the mother liquor. Temperatures from about 60° C. to about 90° C., preferably from about 70° C. to about 90° C., are suitable for this step. The preferred vacuum range is from about 5 to about 30 mm Hg. This water removal substantially reduces ferrate decomposition in the second higher temperature drying/carbonation step. Any conventional batch or continuous vacuum drying apparatus like tray, rotary or rotating cone-type vacuum dryers may be employed. The removal of the water increases the concentration of the hydroxides present. For example, NaOH or KOH concentration in the mother liquor phase in the resulting vacuum dried product is at least about 55%–70% while the water content is reduced to below 45% by weight.

This first drying step normally will also cause the cake mass to break apart into small size free-flowing crystals. If this does not occur to a suitable degree, it is preferred that this vacuum dried ferrate salt be delumped by means of compression rollers or the like before the next step.

The reduced $H_2O$ content crude ferrate cake is then subjected to a drying and partial carbonation step which further reduces any remaining water content in the crude cake and preferably partially converts from about 10% to about 99% of the remaining hydroxide to carbonate using a heated gas stream containing a specified amount of $CO_2$. A liquid source of $CO_2$ is preferred, although other $CO_2$ sources (e.g. from natural gas) may be used. The hydroxide/carbonate ratio base can be adjusted to meet the applications use of the dried ferrate product by either employing more or less $CO_2$ in the heated gas stream or limiting the time which $CO_2$ is in the heated gas stream. For example, one application may need the extra hydroxide content of the product in a wastewater treatment or oxidation process. Another application may require reduced amounts of hydroxide which can be provided by carbonating up to about 99% of the hydroxide to carbonate. The higher the hydroxide to carbonate ratio in the ferrate product, the more stable its shelf life.

In practice, the partially dried ferrate cake from the vacuum drying step may be fed into any batch or continuous type dryer that can be adapted with a heated air stream containing a specified amount of $CO_2$. Examples are fluid bed, rotary, tray, convention and batch dryers. Preferred are the rotary, tray and fluid bed dryers.

Suitable drying temperatures for this second drying stage are from about 110° C. to about 160° C., more preferred is a range of about 120° C. to about 150° C. This high temperature drying continues until the product is a substantially water-free dried cake, i.e., more than 90% by weight, more preferably, more than about 95% by weight, of the original water content of the crude cake which has been removed. However, the time period for this stage of drying is determined by the final desired hydroxide/carbonate ratio. This normally takes from about 0.5 to 5.0 hours.

The heated air stream for this second step has preferably been previously dried or dehumidified to have a dewpoint of 0° C. to about −70° C., or more preferred to a range of about −10° C. to about −40° C., with a $CO_2$ content of about 0.01% to about 5% by volume to remove any remaining $H_2O$ and convert a portion of the hydroxides to carbonate. The dry air/$CO_2$ mixture could be recycled, if preferred, by passing it through a dessicant bed for $H_2O$ removal. However, it should be noted that ambient air without dehumidification may also be used, but may result in some ferrate decomposition during this second step.

When the hydroxide concentration in the mother liquor phase of the crude ferrate cake is ar about 55% by weight or higher, the carbonates produced by its reaction with $CO_2$ at temperatures above about 110° C. are the anhydrous forms of carbonate compounds such as $Na_2CO_3$ or $K_2CO_3$ with the release of $H_2O$. This is illustrated by the following equation (A):

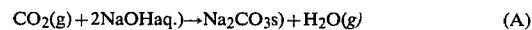

$$CO_2(g) + 2NaOH aq. \rightarrow Na_2CO_3 s) + H_2O(g) \qquad (A)$$

The advantage of having this high temperature carbonation follow the lower temperature vacuum drying is that the ferrate cannot dissolve into a carbonate-water phase and then decompose. This may happen when the hydroxide is directly carbonated at lower temperatures and the hydrated $Na_2CO_3 \cdot 7H_2O$ and $Na_2CO_3 \cdot 10H_2O$ forms are precipitated out of solution and the remaining ferrate product dissolves in the liquid phase and gradually decomposes. This decomposition may also occur if the crude ferrate cake is directly carbonated at high temperatures without the intermediate vacuum drying step because of the presence of too much water and not enough hydroxide during carbonation.

The preferred dry air flowrate is from about 1 to about 5 cubic feet per minute (CFM) per pound of crude cake in order to remove the water generated from the crude cake during this drying/carbonation step.

Carbonate content (e.g. $Na_2CO_3$ or $K_2CO_3$ amounts) in the final product may range from about 1% to about 45%, or more preferable from about 1% to about 20%, by weight of the final product. The ferrate content (e.g. $Na_2FeO_4$ or $K_2FeO_4$) may range from about 50% to about 98% by weight. The hydroxide (e.g. NaOH or KOH) content may range about 0.01% to about 15%. The amount of $H_2O$ remaining preferably is less than about 4% by weight, more preferably less than about 1% by weight.

It should be noted that a pure $CO_2$ gas stream is not preferred because the heat of reaction between the $CO_2$ and the hydroxides may be so great as to decompose the ferrate salt.

The product is a dried, free flowing solid which can be easily ground to provide a powder form product. The product can also be compressed into pellet, tablet, briquette, or pill form by use of commercial compaction equipment and methods. Packaging should also be preferably moisture proof and airtight to prevent or block atmosphere moisture from contacting the solid product. Shelf life of the product ar room temperature is very long with assay losses having been found to be no more than about 0.2% ferrate per month for periods as long as six months.

The process of the present invention has several advantages over the process disclosed in the Mein et al patent. These advantages include the following:

(a) No concentrated potassium sait washes are needed. This reduces chemical costs and recycle problems.

(b) The present invention has fewer processing steps and requires less processing equipment.

(c) A stable high assay product is prepared which may be employed in different applications because the hydroxide to carbonate ratio may be adjusted, thereby resulting in a product that may be modified for applications at different pHs.

The following Examples and Comparisons further illustrate the present invention. All parts and percentages are by weight unless explicitly stated otherwise.

EXAMPLE 1

Two Stage Drying/Carbonation of 50% NaOH Washed Crude Ferrate (VI) Cake

Exactly 20.00 gm of a 50% by weight NaOH washed $3K_2FeO_4.Na_2FeO_4$ crude cake was put in a 250 ml filter flask with stopper and connecred to a 30 mm Hg vacuum water aspirator. Initial crude ferrate cake had an assay of 76.6% $3K_2FeO_4.Na_2FeO_4$ with 6.9% NaOH, 6.9% $H_2O$, 2.0% NaCl, 5.9% $Na_2CO_3$, and 1.7% other components (i.e., $Fe_2O_3$, $NaClO_3$). No indication of decomposition was noted. The flask was immersed in an 80° C. water bath and vacuum dried for a period of 1½ hours. The intermediate vacuum dried ferrate product had a weight of 18.90 gm with an assay of 80.7% $3K_2FeO_4.Na_2FeO_4$, thus having a ferrate salt loss of only 0.4% by weight, the balance of the weight loss being $H_2O$. The vacuum dried intermediate product was free flowing.

Then 16.00 gm of the intermediate vacuum dried product was put in a 135° C. air circulating convection oven for the second stage drying and partial carbonation. The circulating air had a 0.03% by volume $CO_2$ content. After 1½ hours, the product was cooled and weighed 15.45 gm with an assay of 82.3% $3K_2FeO_4.NaFeO_4$, thus having a ferrate salt loss of only 1.5% by weight during the high temperature drying/partial carbonation processing step. This final product contained about 6.5% NaOH, 1.0% $H_2O$, and 8.7% $Na_2CO_3$. The product had a ferrate assay of 82.8% after two weeks of storage at room temperature. The slight increase in assay % was due to the inaccuracy of the assay method and sampling error.

EXAMPLE 2

Two Stage Drying/Carbonation of 45% KOH Washed Crude Ferrate (VI) Cake

The same equipment setup and drying conditions as in Example 1 were used except that the precipitated crude ferrate cake was washed with 45% by weight KOH instead of 50% NaOH before processing. The initial crude ferrate cake had an assay of 83.9% $3K_2FeO_4.Na_2FeO_4$ with 2% KOH, 2.4% $H_2O$, 6.8% $Na_2CO_3/K_2CO_3$, 2% NaCl, and 2.9% other components (i.e., $Fe_2O_3$, $NaClO_3$). After vacuum drying at 80° C. for 1½ hours, the intermediate vacuum dried ferrate product had a weight of 18.96 gm with an assay of 88.0%, thus having a ferrate salt loss of only 0.6% by weight, the balance of the weight loss being $H_2O$. The vacuum dried intermediate product was free flowing.

Then 16.00 gm of this vacuum dried intermediate product was further dried/partially carbonated in the air circulating convection oven at 135° C. for 1½ hours. The level of $CO_2$ in the air was the same as Example 1. After cooling, the product weighed 15.83 gm and had an assay of 88.9%, thus having no measurable ferrate salt loss during the high temperature drying/partial carbonation processing step. The final product also contained about 0.4% KOH, 0.2% $H_2O$, and 9.0% $Na_2CO_3/K_2CO_3$. The product was easily ground into a fine powder. The product had a ferrate assay of 89.4% after two weeks of storage at room temperature. The slight increase in assay % was due to the inaccuracy of the assay method and sampling error.

EXAMPLE 3

Two Stage Drying/Carbonation of Crude Ferrate (VI) Cake Precipitated From 35% NaOH Mother Liquor Solution Exactly 20.00 gm of a lower assay $3K_2FeO_4.Na_2FeO_4$ crude cake was put in the 250 ml filter flask with stopper and connected to 30 mm Hg vacuum water aspirator. Initial crude cake has an assay of 59.0% as $3K_2FeO_4.Na_2FeO_4$ with 11.60% NaOH, 4.2% $Na_2CO_3$, 21.5% $H_2O$, and 3.7% other components. The flask was put in a 75° C. water bath and vacuum dried for a period of 1 hour. The intermediate dried ferrate product had a weight of 18.24 gm with an assay of 64.4% $3K_2FeO_4.NaFeO_4$, thus having only a 0.4% ferrate loss with the balance of the weight loss as $H_2O$. The intermediate product was free flowing.

Then 10.586 gm of the vacuum dried intermediate product was put in a Mettler LP-15 infrared heat moisture balance for drying and partial carbonation for a period of 20 minutes at 120° C. The level of $CO_2$ in the air was the same as Example 1. The final product weighed 10.170 gm and had an assay of 66.9%, thus having only a 0.14% ferrate loss during the processing. The final ferrate also contained 13.3% NaOH and 6.3% $Na_2CO_3$. The sample after four months of storage had an assay of 66.0%, for an average ferrate assay loss of 0.2%/month.

COMPARATIVE EXAMPLES 1-3

Crude Ferrate (VI) Cake Direct Carbonation Tests

A carbonation apparatus was constructed using a 250 ml volume vacuum filter flask. The top inlet of the flask was adapted with a gas inlet connection and the sidearm was adapted with a gas outlet connection. The $CO_2$/air volume % mixtures were prepared by a two rotometer control system with a gas mixing chamber. Compressed air was used as the air source and was passed through a DRIERITE anhydrous calcium sulfate dessicant column bed to provide a −70° C. dewpoint dry air source. A liquid $CO_2$ cylinder was used as the $CO_2$ source. The carbonation assembly was immersed in a constant temperature bath to obtain the required carbonation processing temperature.

The crude ferrate cake precipitate used in these set of tests was a mixed ferrate salt crystal with a composition of $3K_2FeO_4.Na_2FeO_4$ which had been precipitated from a 30% NaOH mother liquor solution by addition of KOH. The crude cake had an initial analysis of 74.4% as $3K_2FeO_4 \cdot Na_2FeO_4$, 6.2% as NaOH, 1.9% as $Na_2CO_3$, 14.5% $H_2O$, and 3% other components. Analysis for NaOH and $Na_2CO_3$ was done by ASTM Method D501-67, compensating for the hydroxide produced by $FeO_4^{-2}$ decomposition by $H_2O_2$ in the analytical procedure. Alternate analysis procedure for NaOH and $Na_2CO_3$ is by a pH titration procedure using the titration volumes used at pH values of 8.0 and 4.0.

COMPARATIVE EXAMPLE 1

Direct Carbonation Using 2.5% $CO_2$ at 45° C.

About 40.03 gm of the 74.4% assay $3K_2FeO_4 \cdot Na_2FeO_4$ crude ferrate cake was put in the carbonation apparatus as described above and immersed in a 45° C. bath. A 2.5 volume % $CO_2$ in dry air gas mixture at 20° C. was introduced into the assembly at a flowrate of 20 standard liters/min. for a time period of 30 minutes. Occasional shaking of the solids was done every 5 minutes. Final product weighed 37.84 gm and had an assay of 68.6% $3K_2FeO_4 \cdot Na_2FeO_4$ with 16.4% $Na_2CO_3$ and a slight residual of 0.3% NaOH. Ferrate salt weight loss during the carbonation was 12.8%. The sample had a ferrate salt assay of 59.9% after a one month storage at room temperature in a capped glass bottle, which corresponds to an initial 8.7% assay rate loss/month. The sample after 7½ months had an assay of 49.5%, for an average ferrate loss rate of 2.5%/month.

COMPARATIVE EXAMPLE 2

Direct Carbonation Using 1.25% $CO_2$ at 22° C.

About 20.25 gm of the 74.4% assay $3K_2FeO_4 \cdot NaFeO_4$ crude ferrate cake was put in the same carbonation apparatus as in Comparative Example 1 except the apparatus was kept at a room temperature of 22° C. during carbonation. A 1.25 volume % $CO_2$ in dry air mixture at 22° C. was used at a flowrate of 20 standard l/min. for a time period of 1½ hours. Occasional shaking of the solids was done every 5 minutes. Final product weighed 18.94 gm and had an assay of 72.6% and 17.0% $Na_2CO_3$ and 0% NaOH residual. Ferrate salt weight loss during the carbonation was 8.8%. One month storage of the sample at room temperature resulted in a ferrate salt initial loss rate of 6.3%/month. The stored sample after 7½ months had an assay of 0.4%, for an average ferrate salt loss rate of 9.6%/month.

COMPARATIVE EXAMPLE 3

Direct Carbonation Using 2.5% $CO_2$ at 0° C.

About 13.65 gm of the 74.4% assay $3K_2FeO_4 \cdot Na_2FeO_4$ crude ferrate cake was put in the same carbonation apparatus as in Comparative Example 1 except the apparatus was immersed in an ice bath at 0° C. during carbonation. A 2.5 volume % $CO_2$ in dry air at 20° C. was introduced at a flowrate of 20 standard l/min. for a time period of 45 minutes. Occasional shaking of the solids was done every 5 minutes. Final product weight was 13.71 gm with an assay of 71.5% with 15.1% $Na_2CO_3$ and 0% NaOH residual. Ferrate salt weight loss during the carbonation was 3.5%. The sample had a ferrate assay of 53.3% after one month of storage, for an initial 18.2% assay loss rate/month. The sample after 7½ months of storage had an assay of 48.5%, for an average ferrate salt loss rate of 3.1%/month.

COMPARATIVE EXAMPLE 4

Direct Heating/Carbonation Without Intermediate Vacuum Drying Step

Exactly 22.666 gm of the 74.4% assay $3K_2FeO_4 \cdot Na_2FeO_4$ crude ferrate cake was put in the same Mettler LP-15 infrared heat moisture balance as in Example 3 except that the crude ferrate cake was not processed with an intermediate vacuum drying step. The ferrate cake was dried and partially carbonated in air for a period of 20 minutes at 120° C. The final product weighed 19.828 gm and had an assay of 78.3% as $3K_2FeO_4 \cdot Na_2FeO_4$, thus having a ferrate salt loss of 7.9% during the processing, the balance of which was $H_2O$. The ferrate product contained 8.3% NaOH and 3.8% $Na_2CO_3$. The sample after 6½ months of storage had an assay of 72.8% for an average ferrate salt loss of 0.85% month.

What is claimed is:

1. A process for preparing a dried, stable mixture of at least one alkali metal or alkali earth metal ferrate (VI) compound with alkali metal or alkaline earth metal hydroxide and carbonate compounds comprising:
   (a) vacuum drying a crude ferrate cake which comprises at least one solid alkali metal or alkaline earth metal ferrate (VI) in admixture with a liquid mother liquor comprising of at least one alkali metal or alkaline earth metal hydroxide and water wherein the amount of said hydroxide is from about 20% to about 50% by weight of the mother liquor; said vacuum drying being carried out at a temperature from about 60° C. to about 90° C. for a sufficient amount of time to remove a portion of said water from said mother liquor and thereby increase the hydroxide concentration in the mother liquor to a range from about 55% to about 70% by weight; and
   (b) further drying said reduced water-content crude ferrate cake at a temperature from about 110° C. to about 160° C. with a heated gas stream for a sufficient amount of time to form a substantially water-free dried ferrate cake; said gas stream containing a sufficient amount of $CO_2$ to react with a portion of said hydroxide present in said mother liquor and thereby forming a dried, stable mixture of at least one alkali metal or alkaline earth metal ferrate (VI) compound with alkali metal or alkaline earth metal hydroxide and carbonate compounds.

2. The process of claim 1 wherein said crude ferrate cake comprises
   (a) from about 45% to about 97% by weight of at least one alkali metal or alkaline earth metal ferrate (VI) compound;
   (b) from about 0.2% to about 10% of at least one alkali metal or alkaline earth metal hydroxide; and
   (c) from about 0.5% to about 16% by weight water.

3. The process of claim 1 wherein said vacuum drying is carried out at a temperature from about 70° C. to about 90° C. and under a vacuum from about 5 to about 30 mm Hg.

4. The process of claim 1 wherein said drying step is carried out with a dehumidified air stream having from about 0.01% to about 5% by volume $CO_2$.

5. The process of claim 4 wherein the Gas stream flow rate in said drying step (b) is from about 1 to about 5 cubic feet per minute per pound of crude ferrate cake.

* * * * *